July 7, 1931.   W. C. MILES   1,813,416
FISH BAIT
Filed April 9, 1930
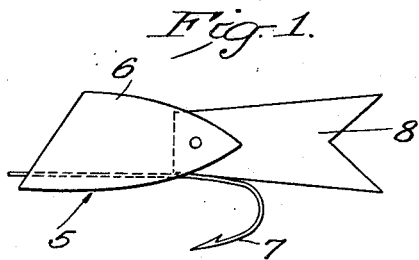
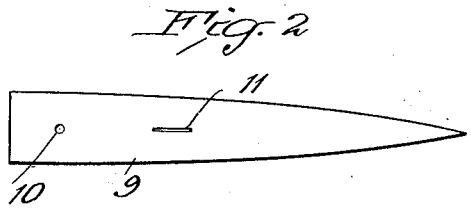
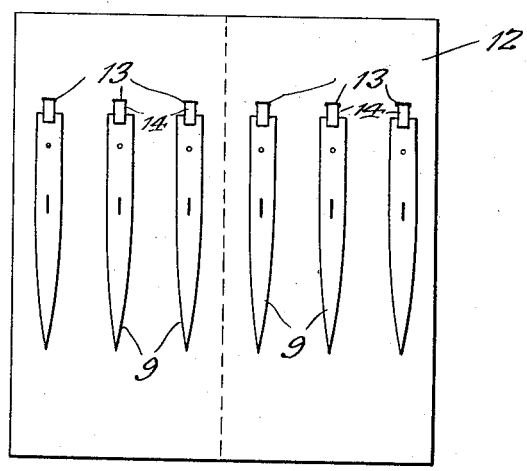
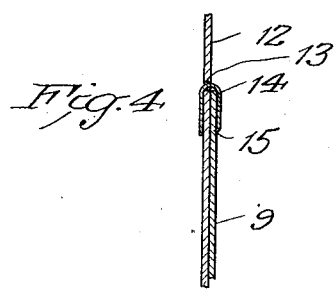
INVENTOR.
William C. Miles Patented July 7, 1931

1,813,416

UNITED STATES PATENT OFFICE

WILLIAM C. MILES, OF WHITE PLAINS, NEW YORK

FISH BAIT

Application filed April 9, 1930. Serial No. 442,782.

This invention relates to fish bait of the flexible-material type adapted to be used in association with a fish hook and to serve as a means for stimulating fish to strike.

Heretofore, pork rind has been extensively employed as the flexible material, but it is open to many objections.

One of the objections to pork rind resides in the fact that it must be carried in a preservative, such as a brine solution. This results in inconvenience to the user, as the container for the brine solution in which the pork rind is carried consumes considerable space in ones tackle box; and, furthermore, the brine solution is often accidentally spilled in the tackle box with detrimental results to tackle carried therein, because of its ability to attack and effect a rusting action on the metal entering into the construction of such tackle and because of its ability to deteriorate or otherwise impair such tackle as lines, flies, leaders, etc.

Another objection to pork rind resides in the fact that if it is left out of the brine solution for any considerable length of time it will harden and lose its intended appearance, thus rendering it unfit for use—the hardening being particularly annoying when one attempts to remove it from a fish hook on which it has been impaled and from which the user has neglected to remove it immediately after a fishing expedition.

Attempts have been made heretofore to provide a substitute for pork rind, and in this connection strips of rubber and also strips of chamois have been proposed. The former of these substitutes has been found objectionable in that it rapidly deteriorates, in that it loses its flexibility, and in that it is too heavy to effectively function if it is of the proportions, both as to area and thickness, usually employed in pork rind for which it is intended as a substitute. Concerning chamois as a substitute for pork rind, this is open to the objection that it will shrivel and harden when dried after use, will undergo excessive stretching either longitudinally or transversely of its length, or in both of such directions, if subjected to careless treatment in the handling thereof either while dried or wet, and particularly in the latter instances as when it becomes soaked with water in use. Moreover, chamois lacks the necessary requirement of toughness to satisfactorily meet the requirements as a substitute for pork rind.

An object of this invention is to provide, as a substitute for pork rind, a flexible material adapted to serve as an attractor in association with a fish hook and to overcome the foregoing and other objections with respect to pork rind and with respect to the above-mentioned prior substitutes therefor.

To the above ends the invention contemplates the use of a material which has certain peculiar characteristics and is hereinafter more particularly described.

Other objects and advantages of the invention will become apparent from the following description taken in connection with the accompanying drawings, in which—

Figure 1 is a side view of a fish lure with which is associated a flexible element embodying this invention; Figure 2 is a face view of a modified form of such flexible element; Figure 3 is a face view of a card showing a plurality of flexible elements mounted thereon, and Figure 4 is an enlarged fragmental sectional view through the card and showing in detail the manner in which the flexible elements are secured in position.

In Figure 1, the numeral 5 indicates a lure of the type shown in Figures 10 and 11 of my Patent No. 1,707,409, dated April 2, 1929. This lure includes a body piece 6, carrying a hook 7 with which is associated a flexible tail 8, the hook and the tail being suitably attached to the body piece and the tail serving as a bait for stimulating fish to strike.

In Figure 2, the bait 9 embodying this invention is shown as a strip of flexible material having an opening 10 at one end thereof and a slit 11 intermediate its ends, the opening and the slit being employed to enable the lure to be associated with the hook of certain well-known types of lures adapted for use with pork rind strips. It is to be here noted that the flexible material, to be hereinafter more particularly described, from which the herein disclosed baits 8 and 9 are made, is the same in both instances.

In Figures 3 and 4, is shown a convenient means for mounting baits embodying this invention, the mounting means serving as a commercial package for the baits and also as a container to be used by the fisherman to enable him to conveniently carry a goodly supply for use. This package or container is preferably made of cardboard 12, which is adapted to be folded along its longitudinal medial line and is provided at opposite sides of such medial line with a plurality of slits 13. These slits are adapted to carry yoke shaped metallic fasteners 14, the arms of which lie contiguous with opposite faces of the cardboard. One arm of each of these fasteners is provided with a spur 15 which, when the arms are forced towards each other with one end of a bait confined therebetween as shown in Figure 4, penetrates the bait and effectively anchors it in its mounted position.

The material that I use in the making of baits embodying this invention is known as No. 189 imitation chamois and is obtainable on the market in the form of tanned skins, each skin being of a size sufficient to enable one to obtain, as by stamping with suitable dies, a comparatively large number of baits of standard pork rind size. This material possesses certain characteristics which are peculiarly advantageous in a bait made therefrom and are as follows: First, the bait is highly absorbent to water and when wet takes on a pork rind appearance; second, the bait will not substantially harden and will not shrivel up or lose its original shape upon drying due to the inherent nature of its structure and may be used over and over again, each time assuming a pork rind appearance when wet; third, the bait is of such a structural nature that it is resistive against stretching in any direction, and possesses a high degree of toughness.

Having thus described the invention, what is claimed is:

1. An imitation pork rind fish bait of flexible tanned skin having the characteristics of No. 189 imitation chamois, to wit: highly absorbent to water, non-shriveling and substantially non-hardening when drying, and resistive to stretching in all directions.

2. An imitation pork rind fish bait of No. 189 imitation chamois.

In testimony whereof, I have affixed my signature in this specification.

WILLIAM C. MILES.